(12) United States Patent
de León

(10) Patent No.: US 11,945,154 B2
(45) Date of Patent: Apr. 2, 2024

(54) PRINTER AND PRINTING METHOD FOR SPACE AND PRESSURE SUITS USING ADDITIVE MANUFACTURING

(71) Applicant: Pablo Gabriel de León, Cape Canaveral, FL (US)

(72) Inventor: Pablo Gabriel de León, Cape Canaveral, FL (US)

( * ) Notice: Subject to any disclaimer, the term of this patent is extended or adjusted under 35 U.S.C. 154(b) by 23 days.

(21) Appl. No.: 17/098,008

(22) Filed: Nov. 13, 2020

(65) Prior Publication Data
US 2021/0146606 A1    May 20, 2021

Related U.S. Application Data

(60) Provisional application No. 62/936,718, filed on Nov. 18, 2019.

(51) Int. Cl.
*B29C 64/118* (2017.01)
*B29C 64/209* (2017.01)
*B33Y 30/00* (2015.01)
*B33Y 70/00* (2020.01)
*B64G 6/00* (2006.01)
*B29K 29/00* (2006.01)
*B29K 31/00* (2006.01)
*B29K 55/02* (2006.01)
*B29K 67/00* (2006.01)
(Continued)

(52) U.S. Cl.
CPC .......... *B29C 64/118* (2017.08); *B29C 64/209* (2017.08); *B64G 6/00* (2013.01); *B29K 2029/00* (2013.01); *B29K 2031/04* (2013.01); *B29K 2055/02* (2013.01); *B29K 2067/046* (2013.01); *B29K 2075/00* (2013.01); *B29L 2031/768* (2013.01); *B33Y 30/00* (2014.12); *B33Y 70/00* (2014.12)

(58) Field of Classification Search
None
See application file for complete search history.

(56) References Cited

U.S. PATENT DOCUMENTS 10,011,073 B2 *   7/2018   Bheda ................... B29C 64/393
2002/0062909 A1 *   5/2002   Jang ........................ B33Y 10/00
                                                                         156/307.3
(Continued)

FOREIGN PATENT DOCUMENTS

CA        3040178 A1 * 10/2019 ........... B29C 64/118
JP     2011520044 A  *  7/2011 ............. A41D 27/02
WO   WO-2015188017 A1 * 12/2015 ......... B29C 67/0055

*Primary Examiner* — Nahida Sultana
(74) *Attorney, Agent, or Firm* — Cognition IP, P.C.; Edward Steakley

(57) ABSTRACT

The present disclosure relates to printing apparatus and manufacturing techniques for the manufacture and fabrication of pressure suits and space suits. The disclosure also relates to space suit components formed from additive polymer, and components including one or more layers of a mesh fabric with an applied layer of an additive polymer. One method includes providing an apparatus comprised of a six-degree of freedom motion manipulator with the motion manipulator attached to one or more printing extruder heads. Additive polymers may be extruded via the one or more printing extruder heads to form 3D printed space suit components.

13 Claims, 13 Drawing Sheets

(51) Int. Cl.
  *B29K 75/00* (2006.01)
  *B29L 31/00* (2006.01)

(56) References Cited

U.S. PATENT DOCUMENTS

| | | | | |
|---|---|---|---|---|
| 2014/0319734 | A1* | 10/2014 | Voit | H04R 25/652 |
| | | | | 264/129 |
| 2014/0374106 | A1* | 12/2014 | Zhu | D01D 5/30 |
| | | | | 166/305.1 |
| 2015/0306282 | A1* | 10/2015 | Scanlon | A61L 31/18 |
| | | | | 623/1.34 |
| 2015/0329991 | A1* | 11/2015 | Masuda | D01F 8/00 |
| | | | | 428/374 |
| 2015/0337896 | A1* | 11/2015 | Dayot | B22F 5/10 |
| | | | | 164/47 |
| 2017/0245494 | A1* | 8/2017 | Bardosh | A01N 25/10 |
| 2018/0290400 | A1* | 10/2018 | Cheng | B33Y 10/00 |
| 2018/0353299 | A1* | 12/2018 | Wei | B29C 64/386 |
| 2021/0170682 | A1* | 6/2021 | Cooper | B29C 64/295 |

\* cited by examiner

PRINTER AND PRINTING METHOD FOR SPACE AND PRESSURE SUITS USING ADDITIVE MANUFACTURING

CROSS-REFERENCE TO RELATED APPLICATIONS

This application claims the benefit of U.S. Provisional Application No. 62/936,718, filed Nov. 18, 2019, which is hereby incorporated by reference in its entirety.

STATEMENT REGARDING FEDERALLY SPONSORED RESEARCH OR DEVELOPMENT

This invention was made with Government support under contract NNX15AM81A awarded by NASA. The Government has certain rights in this invention.

BACKGROUND

Manufacture of pressure suits (also called space suits) has been generally performed using traditional sewing techniques and has evolved very little since the inception of high altitude protection suits in the 1950s. Tolerances on the order of fractions of millimeters are usually required in pressure suit manufacturing. Consequently, accuracy of stitches is crucial and requires manufacturing exclusively by hand. The traditional manufacture of pressure suits requires many years of training for seamstresses, tailors and other trades, to acquire the necessary expertise. This expertise is becoming more difficult to find due to automation of clothing manufacturing, leading to high cost and high waste rates for the soft goods components of pressure suits. Consequently, all space suits and space suit components can only be designed, manufactured, tested, and maintained within Earth-based facilities.

As humans venture beyond low Earth orbit, new methods may be required to manufacture, alter, service, and maintain full pressure suits so that fabrication can occur off-Earth without the requirement of current artisanal methods.

Results of recent testing using additive manufacturing, i.e., 3 dimensional (3D) polymer printers, on the International Space Station suggest that manufacturing using additive printing is possible, even in the difficult microgravity environment, and may be simpler in reduced gravity environments such as the Moon or Mars. This is due to the fact that the printed filaments will "fall" into the printing bed or mold, in a similar fashion as they fall in the Earth, albeit with different speeds. As such, calibration of the printers to the correct gravity gradient may be required.

An apparatus and procedure which allows the manufacturing of pressure suits using additive technologies may assure repeatability, and end dependence of artisan skills. Such a capability may reduce dependence on Earth (except for raw materials) for these fundamental tools of space exploration, and, consequently, may facilitate planetary and space settlement for humankind.

SUMMARY

Described herein is an innovative system and methods for both an additive manufacturing printer and the associated manufacturing method to produce space suit components, which can be assembled together in a destination beyond Earth. The system and methods disclosed herein includes both the equipment utilized to print and the method to manufacture full pressure suits which allows reduction of or complete independence of sewing space suit components together.

In one embodiment, there is a method of printing space suit components using an additive polymer. The method includes providing an apparatus that has a six-degree of freedom motion manipulator. The motion manipulator is attached to one or more printing extruder heads of a 3D additive printer system. The one or more printing extruder heads may extrude additive polymers in a three-dimensional pattern to create printed space suit components. The extruded or deposited additive polymers may include water-soluble filaments to add structural integrity to the printed space suit components.

A three-dimensional mold may be provided over a printing bed to support a deposit of the additive polymers. The one or more printing extruder heads may deposit additive polymers onto the three-dimensional mold.

The space suit components may be formed with interleaving layers of a porous fabric and layers of the additive polymers. A first layer of a porous fabric may be provided. The one or more printing extruder heads may deposit a first layer of additive polymers onto the first layer of the porous fabric. A second layer of porous fabric may be added onto the first layer of the additive polymers deposited onto the first layer of the porous fabric. The one or more printing extruder heads may deposit a second layer of additive polymers onto the second layer of the porous fabric. Additional alternating layers of porous fabric and additive polymers may be added.

While printing the space suit components, Polyvinyl alcohol may filament be applied to portions of the extruded additive polymers. The Polyvinyl alcohol material provides structural support of the portions during printing of the space suit component. Later, the Polyvinyl alcohol material that was applied to the portions of the extruded additive polymers space suit components may be removed with water and/or a water-based liquid.

The printed space suit components are characterized in that the space suit component is a flexible thermoplastic that can withstand external pressurization. The flexible thermoplastics may withstand pressurization (for example pressurization from atmospheric gas, oxygen or another gaseous mixture). The resulting space suit of formed of the printed space suit components may be used in the interior or exterior of a space vehicle, or on the moon, a planetary surface, an asteroid, and/or submersed in liquid, gaseous or vacuum environments.

In another embodiment, there is a method of printing space suit components using an additive polymer. A three-dimensional printer may print a vertical-shaped cylinder by extruding an additive polymer. A non-rigid thermoplastic may be integrally formed with vertical-shaped cylinder to create a cylindrical-shaped space suit component. For example, the non-rigid thermoplastic material may be a thermoplastic polyurethane, and the cylindrical-shaped space suit component may be an arm portion or a leg portion of a space suit.

While printing the vertical-shaped cylinder or after printing the vertical-shaped cylinder, a Thermoplastic Polyurethane, Polylactic Acid (PLA), Acrylonitrile Butadiene Styrene (ABS) or other thermoplastic, may be fused with the space suit component to form a disconnect ring. The disconnect ring is configured to allow the space suit components to be connected together. Additionally, a pivotal 180-degree gimbal may be used during printing to add the printed additive polymer to form joins of the space suit components.

In another embodiment, there is a 3D-printed space suit component. The space suit component is formed from an additive polymer. The space suit component includes one or more layers of a mesh fabric with an applied layer of an additive polymer. The space suit component may include a disconnect ring formed from a thermoplastic, and the disconnect ring connected to the space suit component. The space suit component may be configured in a vertical-shaped cylinder that is fused together with a non-rigid thermoplastic. For example, the non-rigid thermoplastic is one of a Thermoplastic Polyurethane, fused to a Polylactic Acid (PLA) or an Acrylonitrile Butadiene Styrene (ABS).

Further areas of applicability of the present disclosure may become apparent from the detailed description, the claims and the drawings. The detailed description and specific examples are intended for illustration only and are not intended to limit the scope of the disclosure.

BRIEF DESCRIPTION OF THE DRAWINGS

In order to describe the manner in which the above-recited and other advantages and features can be obtained, a more particular description is set forth and may be rendered by reference to specific examples thereof which are illustrated in the appended drawings. Understanding that these drawings depict only typical examples and are not therefore to be considered to be limiting of its scope, implementations may be described and explained with additional specificity and detail through the use of the accompanying drawings.

DETAILED DESCRIPTION

Figure 1:
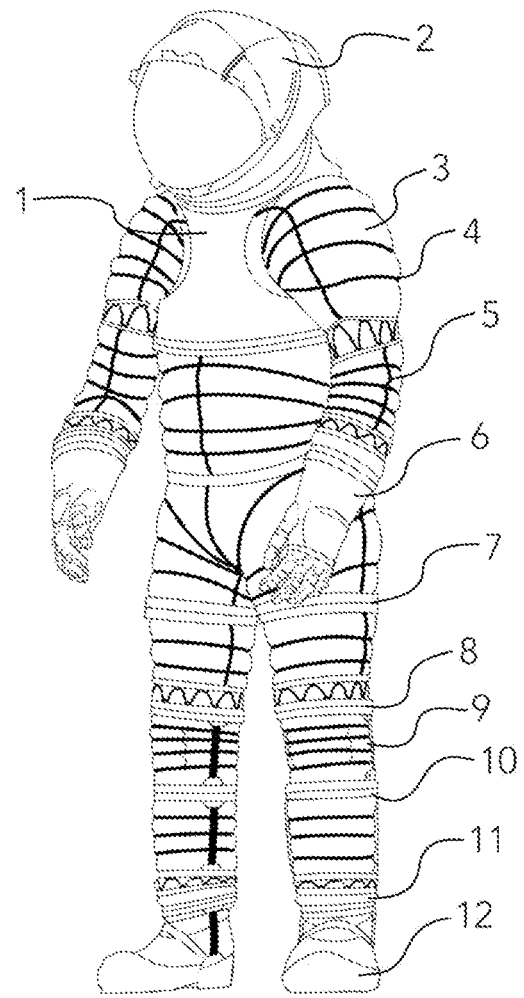
FIG. 1 depicts a view of an example space suit that can be manufactured using the techniques and procedures detailed in the present disclosure.

In this specification, reference is made in detail to specific embodiments of the invention. Some of the embodiments or their aspects are illustrated in the drawings.

The disclosed additive manufacturing 3D printer system incorporates at least one robotic arm with six degrees of freedom of movement. Multiple robotic arms are possible. At the effector end of the arm are located multiple extruder heads, each including a heating element coupled with a mechanism for advancing the filament material. An additional standard large-footprint 3D printer is also part of the disclosed invention, as well as a 180-degree gimbal mounted in the printing bed, to produce moving joints. The 3D printing system may utilize a modified three-dimensional polymers printing machine, with diverse attachments to print vertical components, as well as joints, boots, etc.

The disclosed additive manufacturing method to produce three-dimensional components comprised of different materials, to include fabrics laid between printed layers, as well as water-soluble filaments for structural integrity during fabrication. These components can be assembled to build a complete pressure suit. This process eliminates, or substantially reduces, the need for traditional fabrication methods, such as sewing, gluing, etc.

The assembled space suit with the printed components may be a space suit formed as a human-shaped enclosure which retains pressure and allows movements under vacuum or partial vacuum. Space suits are anthropomorphic envelopes, allowing astronauts to perform movements inside them, that while encumbered, due to the pressure differential, allow useful work outside the primary space vehicle. A typical space suit is made of several different layers, being the two most important ones, the bladder, which is an air-tight layer that maintains pressurization and allows the gas (oxygen) to circulate around the suit and the second one, the restraint layer. The restraint layer keeps the bladder from over pressurizing, and a allows the movements by the astronaut, thanks to a series of joints and mobility mechanisms. In the current space suit used in the International Space Station, the typical operating pressure during an extravehicular activity (space walk outside the confines of the pressurized area) is of 4.3 PSI (or 29.6 kilopascals). The bladder, constrained by the restraint layer, need to maintain this pressure inside the envelope of the space suit.

Instead of relying in the traditional methods of manufacturing of space suits, such as individual paper patterns, sewing and/or glued of fabrics manually, the present disclosure describes a novel additive manufacturing process to print space suit components. As described herein, several different methods may be utilized to print the space suit components in three dimensions. Instead of using typical rigid filaments utilized in conventional 3D printing that form rigid structures, the disclosure describes the use of additive polymers that allow for the formation of space suit components that provide flexibility and the ability to withstand pressurized and/or vacuum environments. These methods allow for 3D printing of flexible components that may be subjected to pneumatic pressure which allow them to be used as the bladder of a space suit.

The disclosed method also allows to print more than one layer, so an additional layer on top or in combination with the bladder can act as restraint layer, in order to keep the anthropomorphic shape, and incorporate mobility joints thereby allowing non-encumbered, or minimally encumbered movement. The restraint layer may be printed in flexible Thermoplastic Polyurethane material. The restraint layer may be of a different thickness than the bladder and may include mobility elements of different shapes and structural capabilities. Other restraint elements, such as steel or plastic cables can be added, to maintain the dimensional and longitudinal shape under pressurization, and at the same time, allow normal movement by the astronaut inside of the space suit. The bladder and restraint layer may be printed during the same printing process thereby reducing manufacturing times and easing the assembly and testing.

According to one method to manufacture a space suit component, a robotic arm manipulator may be provided or utilized where the robotic arm manipulator has attached thereto one or more printing head(s) for extrusion or deposition of an additive polymer-based material. This fabrication method may utilize different systems or printing approaches depending on how the space suit component is to be manufactured. For example, a three-dimensional form may be installed in a printing area over which the one or more printing head(s) may additively deposit an extruded polymer. This fabrication method may incorporate precut fabrics installed between the polymer layers to add strength and shape and provide pressure-resistance to the space suit component. The polymer may include water-soluble support filaments to add structural strength to the space suit component during the manufacturing process.

According to another method to manufacture space suit components, a typical three-dimensional printing machine may be modified to print Thermoplastic Polyurethane. These modifications may include alterations in the speed and temperature in order to print thin sections of circular joints to form arms, leg sections, etc. These portions may be manufactured vertically, and do not require joint sections. This method can also incorporate a secondary printing head, also called Dual Extrusion, which may print on a water-soluble support material, for example a Polyvinyl Alcohol filament. This Polyvinyl Alcohol material may be used as structural support for weak and thin flexible section components. Once manufactured, the space suit part may be submerged in water or a water-based solution. The water dissolves the Polyvinyl Alcohol support material thereby removing the applied Polyvinyl Alcohol from the printed space suit part.

According to another method to manufacture space suit components, a typical three-dimensional printer may be modified to print Thermoplastic Polyurethane to form moveable or flexible joints of the space suit. For example, instead of printing in a regular horizontal printing bed, a 180 degrees gimbal mechanism may be utilized such that printing heads printed component may be may be maneuvered into different positions while the printer is manufacturing the part. The gimbal allows for the printed component to move both in angle and in sideways manner. Moving the printed component into different positions allows the component to be printed with the right angle and form a "asymmetric accordion" joint (which is necessary to accommodate a moving anthropomorphic joint.)

According to another method to manufacture space suit components, a regular three-dimensional printer, using dual extruders may be utilized to print both a flexible Thermoplastic Polyurethane with a rigid thermoplastic. For example, the flexible thermoplastic may be a Thermoplastic Polyurethane to a rigid Polylactic Acid (PLA) or Acrylonitrile Butadiene Styrene (ABS). Both, the flexible Thermoplastic Polyurethane and the rigid thermoplastic may be fused together forming a seal that can retain pressure. This method provides manufacture of flexible portions of a space suit, such as arms or legs, that may be fused together to rigid components of a space suit, such as upper torsos, or brief sections.

Referring now to the figures, FIG. 1 depicts an example space suit that can be manufactured using the techniques and procedures described in the present disclosure. The particular suit shown in FIG. 1 is called "hybrid" type of space suit, which incorporates both hard elements and soft elements.

The hard elements are normally composed of hard, non-moving components, for example the helmet 2 and upper torso 1, while the soft elements may be components made of the space suit of different layers or fabrics. These components may be assembled together using connecting rings or other interfaces to form a space suit capable of holding pressure. The suit depicted in FIG. 1 does not include the outer cover layer, normally called Thermal Micrometeoroid Garment (TMG).

This particular suit depicts a hard-upper torso 1 printed on thermoplastic materials, such as carbon-fiber reinforced Nylon filament or other suitable material and a hard helmet, 2 printed in a similar material as the torso. The arms 3 may be fixed directly to the torso 1 and may include a pressure-hold sealed bearing in between the shoulder 3 and torso 1 section to ease arm rotation.

This system and processes described herein also allows for the printing of both, the bladder and the restraint layer in just once process, or as a separate manufacturing, which can be assembled together later on.

The arm section is composed by flexible thermoplastic zones 3, followed radially by restraint 4 elements, composed by a stronger thermoplastic, or printed by a thicker layer, on the same printing action. Some areas of the body, which require no mobility, such as long extremities, (femur, tibia, or humerus and ulna and radius) may be followed by joint sections 5, 9 on the knee and elbow, to allow movement. Gloves 6, and other elements of the suit, also printed with additive manufacturing, can be assembled together by interconnecting rings 7, 8, 10, 11. The interconnecting rings may be made of metal, using traditional methods, such as lathes or CNC machines, or also printed on metal filaments, Direct Metal Fusion technologies or other additive manufacturing methods. Boots 12 may also be printed. As the boots 12 are a part of the space suit that suffers constant wear and tear. In particular, usage of the boots on planetary surfaces such as the moon or Mars may require replacement on a regular basis.

Figure 2:
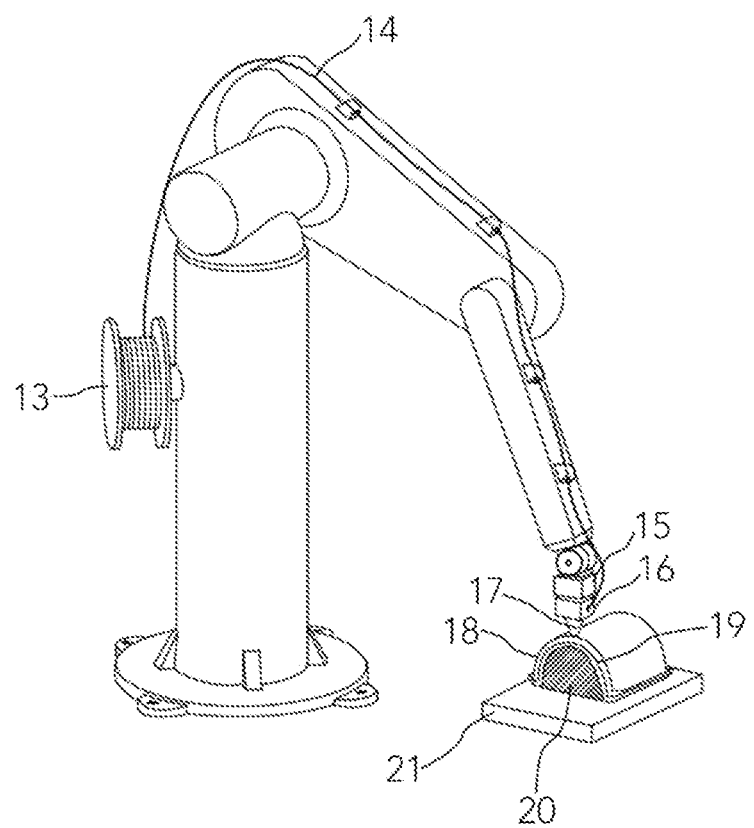
FIG. 2 depicts an example apparatus for fabricating space suit components.

FIG. 2 depicts an example apparatus for fabricating space suit components. The apparatus includes a modified robotic arm with an extruder at the end. The modified robotic arm with the extruder allows the printing of complex shapes that otherwise could not be printed using on a traditional 3D printing machine. The added degrees of freedom provided by the robotic arm may permit the manufacturing of shapes that may be printed on top of a solid mold. This printing method is not available with common 3D printing machines which typically only print over a horizontally flat surface. A filament roll 13 may be feed into the printer with a thermoplastic filament 14 moving about the robotic arm. The filament 14 may be fed into the printer head. The printer head may include a feeding mechanism 15 which pushes the filament down to a "hot end" of the robotic arm. The hot end (i.e., the printing head) may be composed of a heating element 16 and a nozzle 17. The heating element 16 heats the filament 14 thereby creating a malleable material. The nozzle 17 allows for the extrusion of the malleable thermoplastic material onto a mold 20. The mold 20 may be secured to bed 21 of the apparatus.

The delivery of the thermoplastic onto the solid mold can be done in one or multiple layers, depending on the specific use of the part. For example, for the sole of a boot, the thermoplastic may be applied in multiple layers, of different elasticities. Also, a mesh fabric may be placed in between layers of plastic thereby allowing for more resistance or allowing for tension in one direction. Creating a "sandwich" between layers, for example using a thermoplastic 21 in the bottom, in close contact with the mold 20, then a mesh or porous fabric 19, and a final thermoplastic layer 18 on the top, may allow the manufacturing of components with specific characteristics, as explained in FIG. 3.

Figure 3:
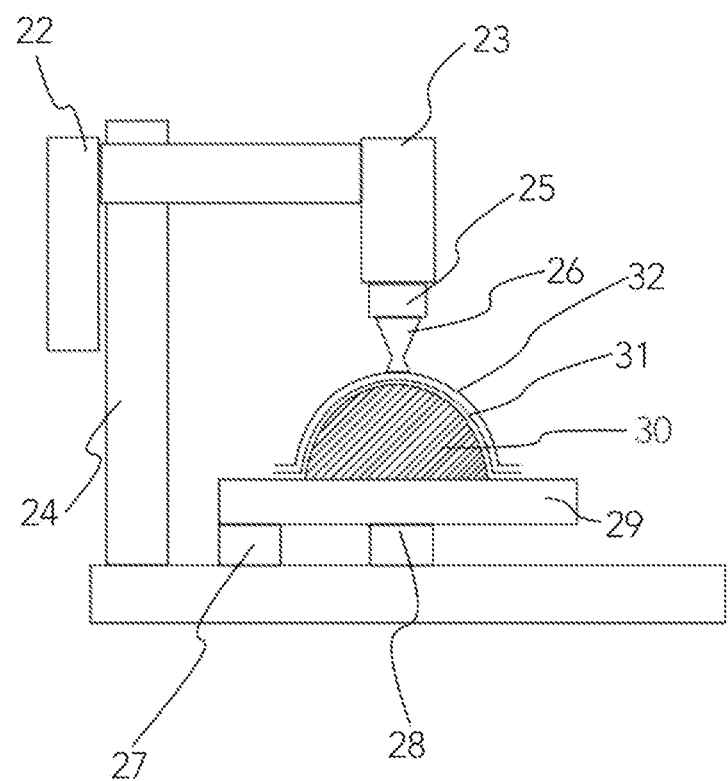
FIG. 3 depicts an example apparatus for fabricating space suit components.

FIG. 3 depicts an example apparatus for fabricating space suit components. FIG. 3 depicts a similar apparatus for fabrication of space suit components as previously described with regard to FIG. 2. The apparatus in FIG. 3 may push a filament 22 using a feeding mechanism 23 to the heating element 25 and through the nozzle 26. This allows for additive depositing of the thermoplastic layers onto the top of the solid mold 30. The solid mold 30 may be mounted on the printer bed 29. The printer bed may be controlled by the apparatus and may be maneuvered in an x-axis, y-axis and/or z-axis via the axis-actuation controllers 27, 28, 24 respectively. Multiple layers of different materials 31, 32 may be printed sequentially allowing for the creation of a "sandwich" composite structure.

The apparatus may be controlled by software that allows for the printing to be actuated or stopped and allow movement of the printing bed in upwards or downwards (i.e., in the z-axis) direction. Printing may be resumed after an operator places a piece of mesh fabric onto a printed layer of material. The porosity of the mesh fabric may allow the thermoplastic layers upper and lower layers to contact each other, sealing the part of the space suit.

Figure 4A:
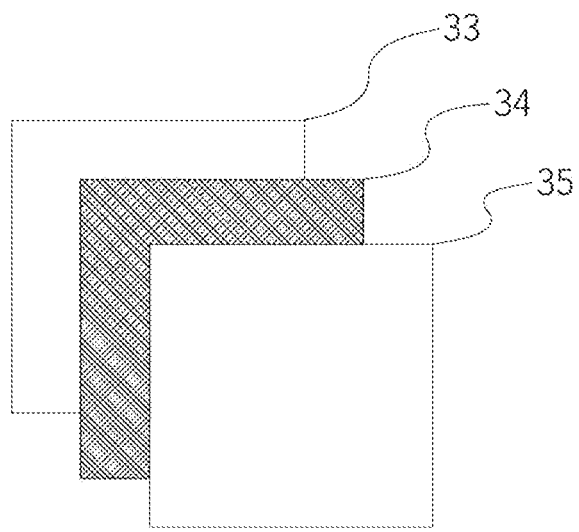
FIG. 4A depicts an example mesh and thermoplastic composite material.
Figure 4B:
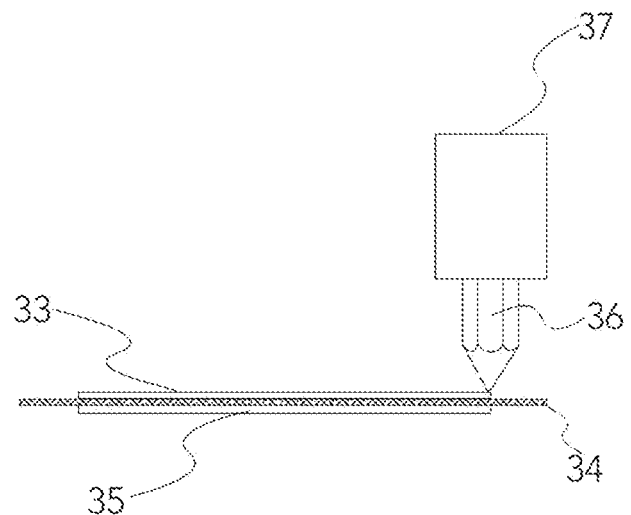
FIG. 4B depicts an example method of fabricating a mesh and thermoplastic composite using a printing apparatus.

FIGS. 4A and 4B depict further details of an example "sandwich" construction of a composite structure. FIG. 4A depicts an example mesh and thermoplastic composite material. FIG. 4B depicts an example method of fabricating a mesh and thermoplastic composite using a printing apparatus. The printing apparatus may be used to manufacture Single-Wall-Laminates (SWL) structures for space suits. The SWL is a space suit structure originally developed by the Arrowhead Rubber Company in the 1950s, and perfected by AiResearch and Litton during the Apollo program, under the work of William Elkins. The SWL was originally created as a compromise between a hard and a soft suit part. Since stowage is always a problem in the reduced internal volume of a spacecraft, a collapsible space suit is preferred to a rigid suit part that, when unoccupied, still have to keep a full volume. For a SWL, the material needs to have enough rigidity to maintain a constant volume (Harris, The Origins and Technology of the Advanced Extravehicular Space Suit, Page. 58) but on at the same time to be foldable for storage. The conventional SWL is a type of composite structure formed by two sheets of fabric and one of Neoprene as the middle layer, bonded together. In the SWL, the bias of both fabrics weave may be set between 22.5 to 45 degrees to each other, in order to lock the suit geometry.

Figure 11:
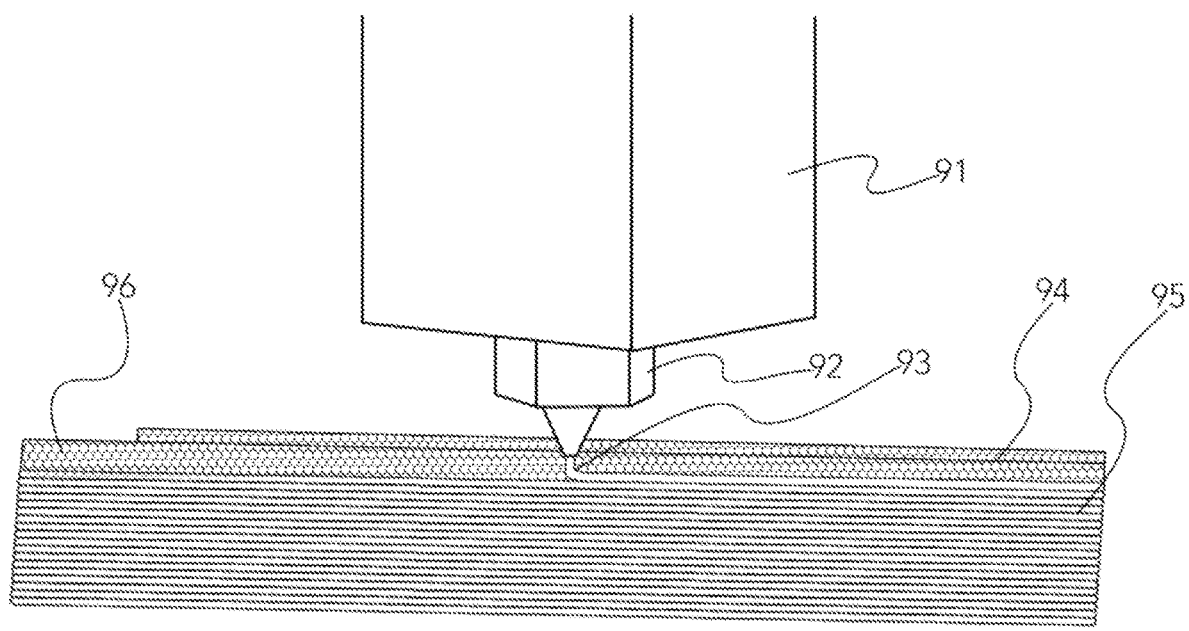
FIG. 11 depicts an example apparatus for fabricating space suit components.

FIG. 11 depicts an example method for fabricating space suit components. FIG. 11 further illustrates the manufacturing procedure as described with reference to FIGS. 4A and 4B. During the printing process, an extruder 91 and nozzle 92 deposits a first layer of flexible thermoplastic 96. Once the first layer is created the printer may be stopped. The printing head (with the extruder 91 and nozzle 92) may be moved upwards (e.g., such as receiving a software command), and the operator manually places the mesh fabric 94 on top. Then the printing head is repositioned, taking into consideration the thickness of the mesh fabric, and a new layer 95 is printed over the mesh fabric. This process can be repeated for additional thickness. For this procedure, a typical diameter of the Thermoplastic Polyurethane 93 is about 1.75 mm, and the diameter may be adjusted to a particular thickness depending on the 3D printer to be utilized in the manufacturing process.

Figure 12:
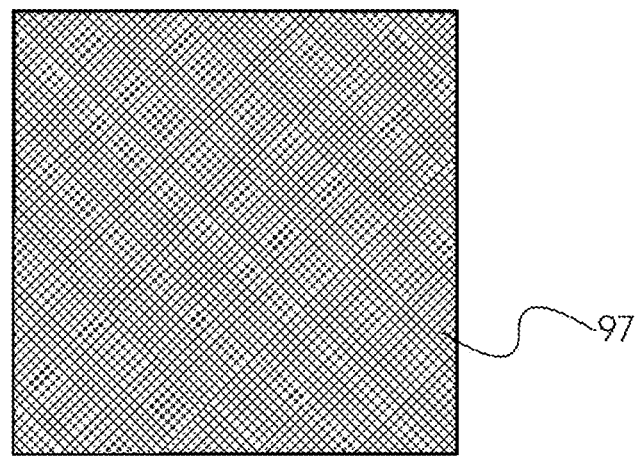
FIG. 12 depicts an example of mesh fabric for use in the fabrication of space suit components.
Figure 12:
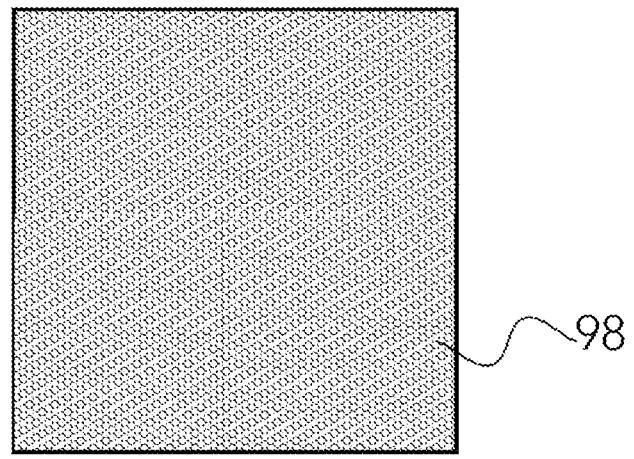

FIG. 12 depicts an example of mesh fabric for use in the fabrication of space suit apparatus for fabricating space suit components. The mesh fabric may be used in accordance with the printing processes as described herein. The mesh fabric to be utilized may include various patterns or shapes. For example, the mesh fabric may include patterns of openings in the fabric that are hexagonal 98 shaped, rhomboidal shaped 97, or of other shapes, including but not limited to square, circular, octagonal, triangular, etc. Also, the mesh fabric may include openings of multiple different shapes. Additionally, the mesh fabric may have different porosities ranges which may depend upon the specific characteristics of the section of the space suit where it will be placed. Also, the mesh fabric may be made of different materials, ideally using polymer fabrics, such as polyester fibers, which have improved adherence ranges.

As depicted with regard to FIG. 4A, instead of bonding conventional fabrics to a Neoprene bladder, a thermoplastic may be extruded as different layers onto a mesh fabric. A first layer may be printed onto the mesh fabric. This first layer may act as a gas retention layer of the space suit. Once the first layer is printed, the printer may be stopped, and one of more layers of mesh fabric 34 may be placed on top of the printed layer. Then the printer may be reset, accounting for the thickness of the mess layer/s. After this procedure, a new layer of thermoplastic may be printed on top of the mesh fabric 34 as a restraint layer 35. Both the upper and bottom layers 33, 35 may be in contact through porous channels of the mesh layers. This allows the upper and bottom layers 33, 35 to seal with each other thereby creating a SWL structure. The construction of flat SWL components may be performed using a printer with its feeding mechanism 37 and hot end 36 to apply a first layer 35 onto the mesh fabric. Once completed, an operator may flip the mesh material and complete the application of the thermoplastic onto the other side of the mesh layer thereby forming a composite of a layer of thermoplastic 33, a layer of mesh fabric 34, and a layer of thermoplastic material 35 which are sealed together.

Figure 5:
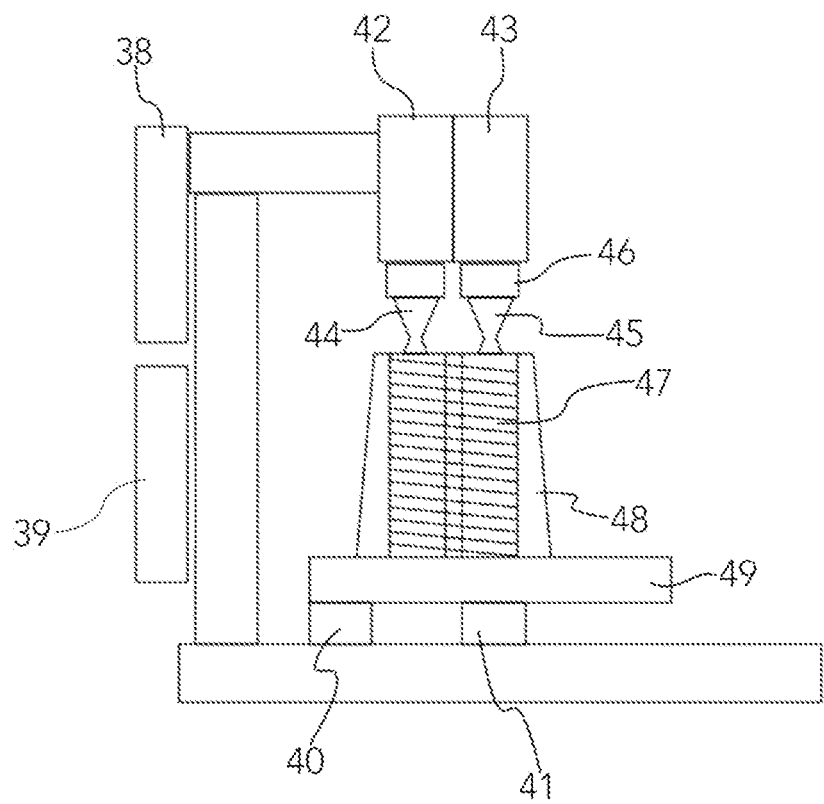
FIG. 5 depicts an example apparatus for fabricating space suit components.

FIG. 5 depicts an example apparatus for fabricating space suit components. The apparatus may be used to fabricate flexible space suit components using a dual extruder 42, 43 to apply a water-soluble support material 39 and extrude a Thermoplastic Polyurethane 38. For some space suit components of reduced thickness or increased height, it may not be possible to print the component only with the Thermoplastic Polyurethane. For example, the component may deform and possible break while being printed. To avoid this situation, a support material of Polyvinyl Alcohol filament 39, may be applied via the printing apparatus. The printing apparatus may include a first extruder 42 and first hot end 44, and second extruder 43 and second hot end 45. The first and second extruders 42, 43 may be installed parallel to one another. A Polyvinyl Alcohol filament may support structurally 48 the part being printed in Thermoplastic Polyurethane 47, using a conventional hot end 46 and nozzle 45. A conventional 3D printer machine, with three-axis control 40, 41 and a bed 49 may be used for the part and its support material. Once the space suit component 47 and its support material 48 is created, the space suit component 47 and the support material 48 may be removed from the printer. Both the space suit component 47 and the support material 48 may submerged in water. The contact with water for a time period (such as several hours) may dissolve the Polyvinyl Alcohol support material and allow the Thermoplastic Polyurethane part of the space suit component to remain. While this support system was used in the past to print Polylactic Acid (PLA), Acrylonitrile Butadiene Styrene (ABS), or other components, as an element of the present disclosure, it is used to print a pressure-holding flexible structure for a space suit.

Figure 6:
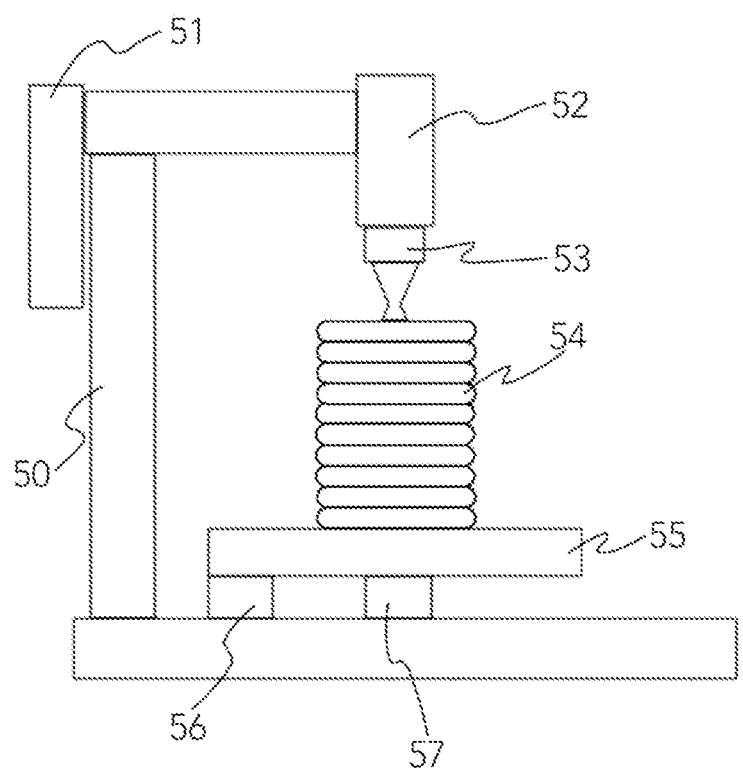
FIG. 6 depicts an example apparatus for fabricating space suit components.

FIG. 6 depicts an example apparatus for fabricating space suit components. The apparatus may be used to fabricate vertical space suit components. For example, the method of fabrication of vertical space suit components may use conventional additive printer using a 3D axis movement system 56, 57, 51, a roll of Thermoplastic Polyurethane 60 and one extruder, 52 and hot end and nozzle 53. This method may be used for example for larger and thicker sections or joints of the space suit, which can stand by itself, without the need of providing a support material during its manufacturing. The construction of the space suit component may initially be supported by the bed 55 and then printed vertically 54 thereby creating the component with the Thermoplastic Polyurethane. Once completed, the component may be removed from the printer and then pressure-tested. For example, the component may be pressure tested using two solid caps at the ends of the component, and applying an air source, clamps and a pressure gauge to test the pressure.

Figure 7:
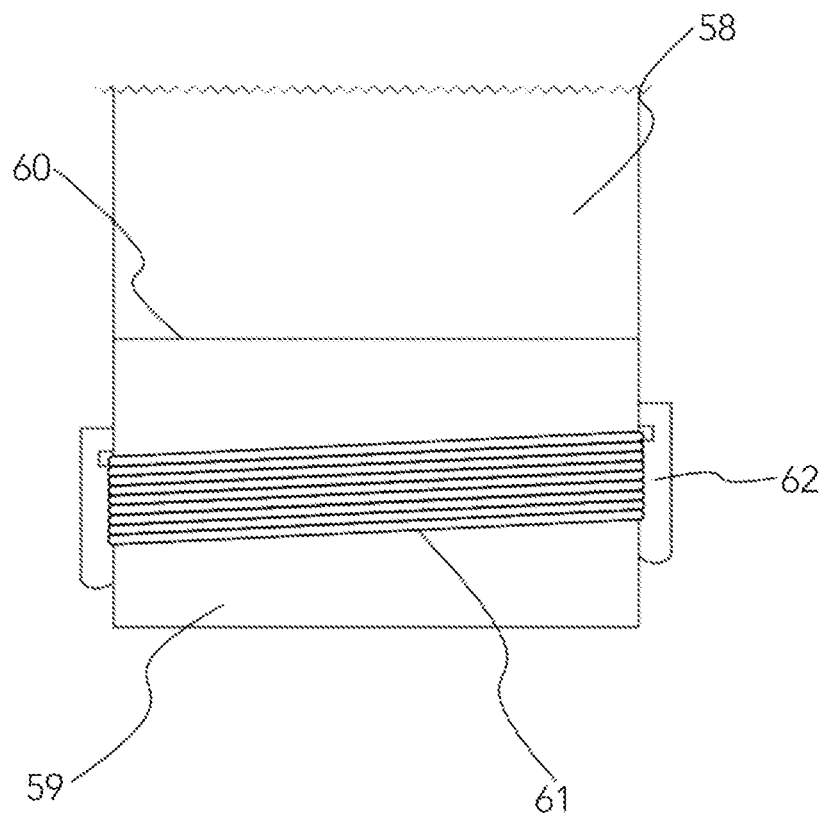
FIG. 7 depicts an example method to connect rigid and flexible components to facilitate space suit assembly.

FIG. 7 depicts an example method to connect rigid and flexible components to facilitate space suit assembly. For example, to create a space suit that can be assembled in another destination, a method to join rigid and flexible components of the suit may be used. A flexible filament, such as of Thermoplastic Polyurethane can be fused with a rigid one, such as Polylactic Acid (PLA), Acrylonitrile Butadiene Styrene (ABS) or another suitable rigid filament. The method of manufacturing is similar to the ones described previously, but using a rigid filament to print the first portion of the connecting part 59. A thread may also be printed in the rigid portion 61. Once the printer reaches a predetermined height, 60, the printer may be paused, and the rigid filament may be exchanged for a flexible one, such as Thermoplastic Polyurethane 58. Both materials, the rigid and the flexible may be fused together, without a gap between them. Once the flexible part is finished, another rigid 3D printed threaded ring 62 may be installed down the joint, to allow interconnection with another section of the suit. This way, multiple sections of the suit, manufactured separately, can be joined, facilitating assembly.

The rigid threaded ring 62 can hold an O-ring to minimize any leakage. Since the seal 60 between the rigid and flexible material is pressure resistant, it may act as a pressure-holding interface.

Figure 8:
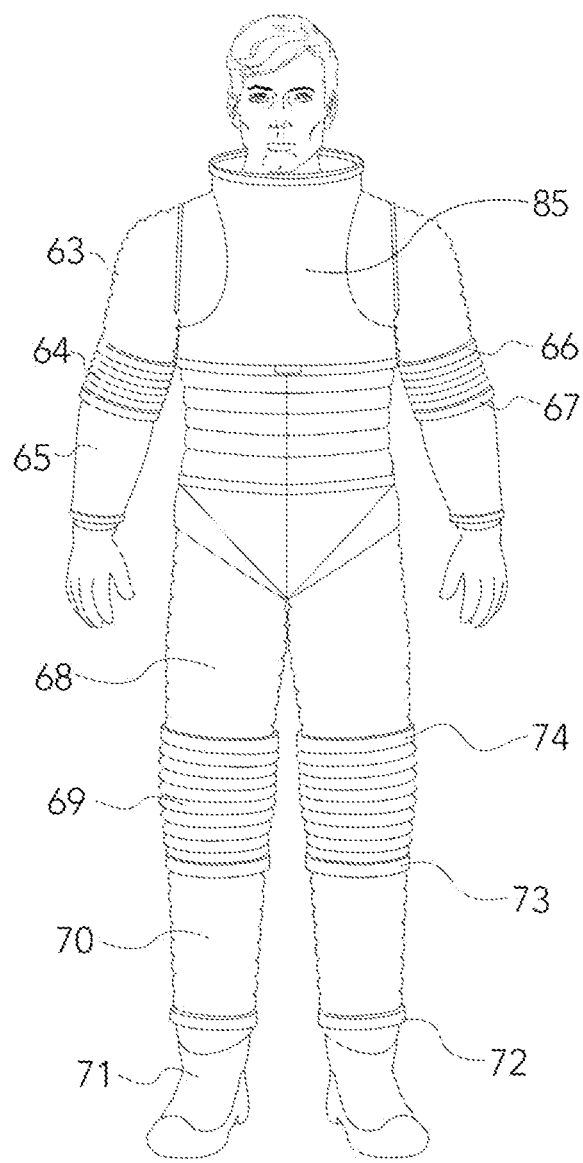
FIG. 8 depicts an example of an additive-manufactured space or pressure suit.

FIG. 8 is a figure of an additive-manufactured space or pressure suit with its multiple sections, using the interconnection method explained previously on FIG. 7. As an anthropomorphic suit composed by different segments, and assembled together by the method explained previously, the suit is composed of an upper torso 85, which can be rigid or may be of a Single-Wall Laminate (SWL) as explained in FIGS. 4A and 4B.

Sections which do not require extensive flexibility, such as lower legs 70, upper legs 68 or upper arms 63 and forearms 65 may be connected by the rings described on FIG. 7 and placed above and below the knee and elbow joints. Then, the connecting rings 73, 74, 66, 67 may separate semi-flexible sections from fully flexible joints 64, 69, which may allow movement in the needed range. These joints can have several configurations used normally in the trade, such as Cardanic, flat-pattern, rolling convolute, toroidal, etc. and any of them can be produced with a combination of the 3D printing methods mentioned in the present disclosure. Boots 71 and its interconnecting rings 72 may also be produced with additive manufacturing methods described herein.

Figure 9:
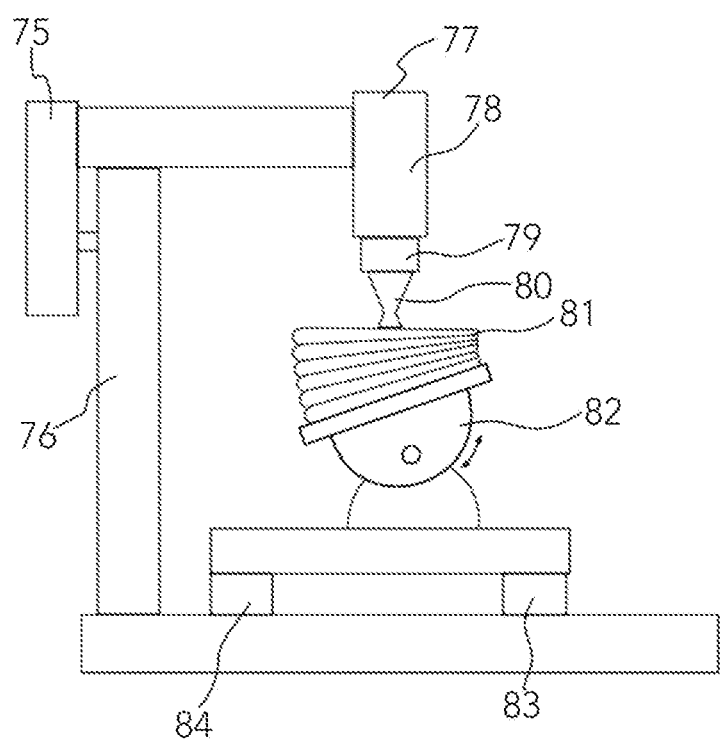
FIG. 9 depicts an example apparatus for fabricating space suit components.

FIG. 9 depicts an example apparatus for fabricating space suit components. The apparatus may be used to manufacture elbow, knee, or other flexible joints for a space suit. For this manufacturing method, a conventional 3D printing machine may be used, with the addition of a gimbal system mounted on top of the printing bed. This printer may include a one more controllers or mechanism for orientation the printing bed in an x-axis by controller 83, in a y-axis by controller 84, and z-axis by controller 76. The printer may include a Thermoplastic Polyurethane filament roll 75, an extruder, hot end and a nozzle portion 77, 78, 79 and 80. As compared to the prior example printing apparatus, the instant apparatus includes a gimbal mechanism 82 that may tilt the printing bed in pitch thereby allowing the printing of an asymmetrical joint 81. The printed asymmetrical joint may have a different front and back. Since conventional 3D printers work vertically over the Z axis, asymmetrical "accordion" like joints cannot be printed by such conventional 3D printers.

The gimbal mechanism 82 may tilt the printing bed in various directions which allows the printing of asymmetrical joints with its corresponding "gores" that can be configured later, with the adequate restraint cables, or elements, into full moving joints for space suits such as the Cardanic, flat-pattern, rolling convolute, toroidal, etc. The "gores" may be a section of a curved surface which lies between two close longitudinal lines, allowing bending in only one direction. These "gores" are used in a space suit joint to allow bending of a knee, or elbow, which only move in one direction, and not in the other, and requires a joint that may do the same.

Figure 10A:
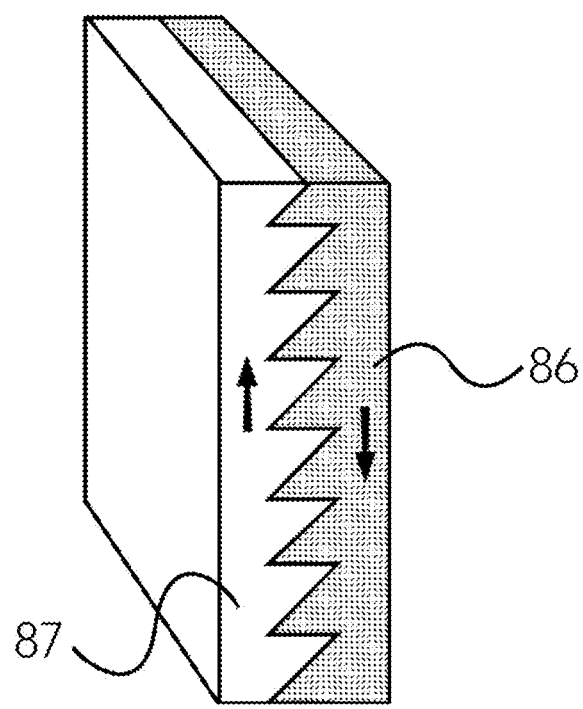
FIG. 10A depicts an example method of fabricating a rigid and flexible composite space suit component.

FIG. 10A depicts an example method of fabricating a rigid and flexible composite space suit component. A rigid portion of the space suit, such as a hard upper torso, may be printed in thermoplastic material such as Polylactic Acid (PLA) and/or Acrylonitrile Butadiene Styrene (ABS). A flexible portion of the space suit component may be printed in a flexible material such as Thermoplastic Polyurethane. In one example, the rigid portion is printed first and then the flexible portion is printed onto the rigid component. In another example, the flexible portion is printed first, and the rigid portion is printed onto the flexible portion. In another example, the flexible and rigid portions are printed together using a dual printer head.

As an example, a rigid and flexible composite component may be required to connect upper torso and arms parts, in a pressure-resistant arrangement. FIG. 10A depicts how printing with dual extruders, one for rigid material and one for flexible, can allow for the printing in a "scaled" fashion, so both materials, a rigid portion 86, and a flexible portion 87 grab or connect into each other increasing the tensile strength required to operate under pneumatic pressure (as indicated by the vertical arrows).

Figure 10B:
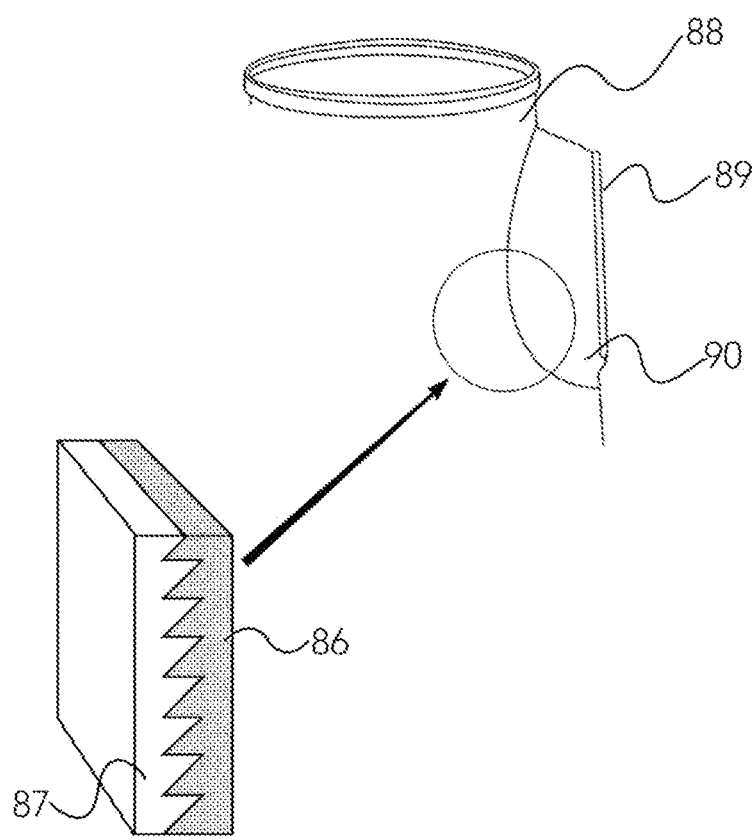
FIG. 10B depicts an example fabricated space suit portion having a rigid and flexible composite area.

FIG. 10B depicts an example fabricated space suit portion having a rigid and flexible composite area. FIG. 10B illustrates a section of the space suit that includes both rigid and flexible composite portions. Portions of the space suit may be printed as described in reference to FIG. 10A. The space suit may have a rigid upper torso 88, a flexible shoulder section 90 and a shoulder ring 89 that can be connected to an arm section. As referred to in FIG. 10A, the space suit may have portions of materials 86, 87 that include a printed composite of both a rigid and flexible portions.

For clarity in explanation, the invention has been described with reference to specific embodiments, however it should be understood that the invention is not limited to the described embodiments. On the contrary, the invention covers alternatives, modifications, and equivalents as may be included within its scope as defined by any patent claims. The following embodiments of the invention are set forth without any loss of generality to, and without imposing limitations on, the claimed invention. In the following description, specific details are set forth in order to provide a thorough understanding of the present invention. The present invention may be practiced without some or all of these specific details. In addition, well known features may not have been described in detail to avoid unnecessarily obscuring the invention.

Various printing systems may be used in accordance with the teachings herein, or it may prove convenient to construct a more specialized apparatus to perform the method. The structure for a variety of these systems may appear as set forth in the description above. In addition, the present disclosure is not described with reference to any particular programming language. It may be appreciated that a variety of programming languages may be used to implement the teachings of the disclosure as described herein.

In the foregoing disclosure, implementations of the disclosure have been described with reference to specific example implementations thereof. It may be evident that various modifications may be made thereto without departing from the broader spirit and scope of implementations of the disclosure as set forth in the following claims. The disclosure and drawings are, accordingly, to be regarded in an illustrative sense rather than a restrictive sense.

What is claimed is:

1. A method of manufacturing a space suit component, the method comprising:
   printing a first component of the space suit by extruding additive polymers using a three-dimensional printer, the three-dimensional printer including a robotic arm with an extruder head, the extruder head having a coupled heating element, and an adjustable printing bed maneuverable in multiple axes, wherein the printing the first component comprises:
   maneuvering the adjustable printing bed in an x-axis, a y-axis and/or a z-axis;
   providing a first layer of a porous fabric;
   feeding, via a feeding mechanism, the additive polymers comprising a thermoplastic filament into the extruder head;
   heating, via the heating element, the thermoplastic filament thereby creating a malleable material;
   depositing by the printing extruder head of the three-dimensional printer, the malleable material forming a first layer of the additive polymers onto the first layer of the porous fabric;
   adding a second layer of porous fabric onto the first layer of the additive polymers deposited onto the first layer of porous fabric;
   depositing by the printing extruder head, a second layer of additive polymers, heated by the heating element of the extruder head, onto the second layer of the porous fabric; and
   applying Polyvinyl alcohol to portions of the extruded additive polymers, the Polyvinyl alcohol providing structural support of the portions during printing of the space suit component; and
   integrally forming with the first component, a non-rigid second component comprising a thermoplastic, wherein the first layer provides a gas retention layer of the first component, and wherein the first component is flat and flexible.

2. The method of claim 1, wherein the non-rigid thermoplastic material is a thermoplastic polyurethane.

3. The method of claim 1, further comprising:
   while printing the first component, fusing together a Thermoplastic Polyurethane, Polylactic Acid (PLA), Acrylonitrile Butadiene Styrene (ABS) or other thermoplastic, to a form disconnect ring, wherein the disconnect ring is configured to allow the space suit components to be connected together.

4. The method of claim 1, further comprising:
   using a pivotal 180-degree gimbal during printing to add the printed additive polymer to form joins of the space suit components.

5. The method of claim 1, further comprising:
   removing the Polyvinyl alcohol that was applied to the portions of the extruded additive polymers space suit components with a water-based liquid.

6. The method of claim 1, wherein the printed space suit component is characterized in that the component is a flexible thermoplastic that can withstand external pressurization.

7. The method of claim 1, further comprising:
   providing a three-dimensional mold over a printing bed to support a deposit of the additive polymers; and
   depositing by one or more printing extruder heads of the three-dimensional printer the additive polymers onto the three-dimensional mold to form the component.

8. The method of claim 1, wherein the additive polymers include water-soluble filaments to add structural integrity to the component.

9. The method of claim 1, wherein the porous fabric is a mesh fabric.

10. The method of claim 1, wherein the thermoplastic filament is retrieved from a filament holder by the feeding mechanism which is disposed adjacent to the extruder head, wherein the feeding mechanism pushes the filament to the heating element.

11. The method of claim 1, further comprising:
    extruding additional additive polymers via one or more additional extruder heads attached to the robotic arm, the one or more additional extruder heads each having a coupled heating element.

12. The method of claim 1, further comprising:
    tilting the adjustable printing bed and printing an asymmetrical joint of the space suit, wherein the adjustable printing bed is coupled to a gimbal mechanism configured to tilt the adjustable printing bed.

13. A method of manufacturing a space suit component, the method comprising:
    printing a first component of the space suit by extruding additive polymers using a three-dimensional printer, the three-dimensional printer including a robotic arm with an extruder head, the extruder head having a coupled heating element, and an adjustable printing bed maneuverable in multiple axes, wherein the printing the first component comprises:
    maneuvering the adjustable printing bed in an x-axis, a y-axis and/or a z-axis;
    providing a first layer of a porous fabric;
    feeding, via a feeding mechanism, the additive polymers comprising a thermoplastic filament into the extruder head;
    heating, via the heating element, the thermoplastic filament thereby creating a malleable material;

depositing by the printing extruder head of the three-dimensional printer, the malleable material forming a first layer of the additive polymers onto the first layer of the porous fabric;

adding a second layer of porous fabric onto the first layer of the additive polymers deposited onto the first layer of porous fabric; and depositing by the printing extruder head, a second layer of additive polymers, heated by the heating element of the extruder head, onto the second layer of the porous fabric;

tilting the adjustable printing bed and printing an asymmetrical joint of the space suit, wherein the adjustable printing bed is coupled to a gimbal mechanism configured to tilt the adjustable printing bed; and integrally forming with the first component, a non-rigid second component comprising a thermoplastic, wherein the first layer provides a gas retention layer of the first component, and wherein the first component is flat and flexible.

* * * * *